United States Patent [19]
Windelman et al.

[11] 3,739,662
[45] June 19, 1973

[54] RETREAD TIRE MARKING METHOD AND APPARATUS

[75] Inventors: Earl A. Windelman; Paul A. Fitzsimmons, both of Glenshaw, Pa.

[73] Assignee: Jas. H. Matthews & Co., Pittsburgh, Pa.

[22] Filed: Jan. 15, 1971

[21] Appl. No.: 106,653

[52] U.S. Cl............... 76/107 R, 18/44, 29/401, 29/526
[51] Int. Cl............................................. B21k 5/20
[58] Field of Search................. 76/107 R; 18/32, 18/42 T, 44; 29/401, 526

[56] References Cited
UNITED STATES PATENTS

| | | | |
|---|---|---|---|
| R19,496 | 3/1935 | Lawson | 18/44 |
| 3,380,121 | 4/1968 | Chittenden et al. | 18/35 |

*Primary Examiner*—Bernard Stickney
*Attorney*—Parmelee, Utzler & Welsh

[57] ABSTRACT

A method and apparatus for application of interchangeable markings on existing tire retreading molds is disclosed wherein a slotted guide member is first clamped to a mold and a milling cutter in a hand held motor driven tool is first run back and forth in the slot to cut a flat surface in the mold. A jig which has a snug fit in the slot is placed in the slot and spaced holes are drilled to a slight depth in the mold. The guide member and jig are then removed, internally threaded plugs are driven into the holes that have been so drilled and a screw is entered into each plug. A metal tag which has previously been embossed with the required information has slotted ends that may be inserted under the heads of these screws is put in place on the flat surface and the screws are tightened down. When the mold is used the indicia on the tag is molded into the retread rubber. To replace a tag, the screws are partly unscrewed, the old tag removed, and the replacement is slipped into place.

8 Claims, 14 Drawing Figures

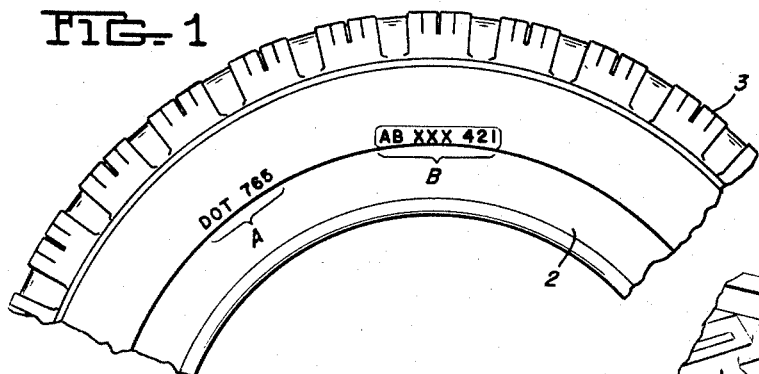
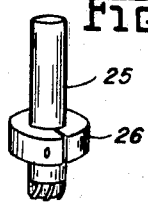
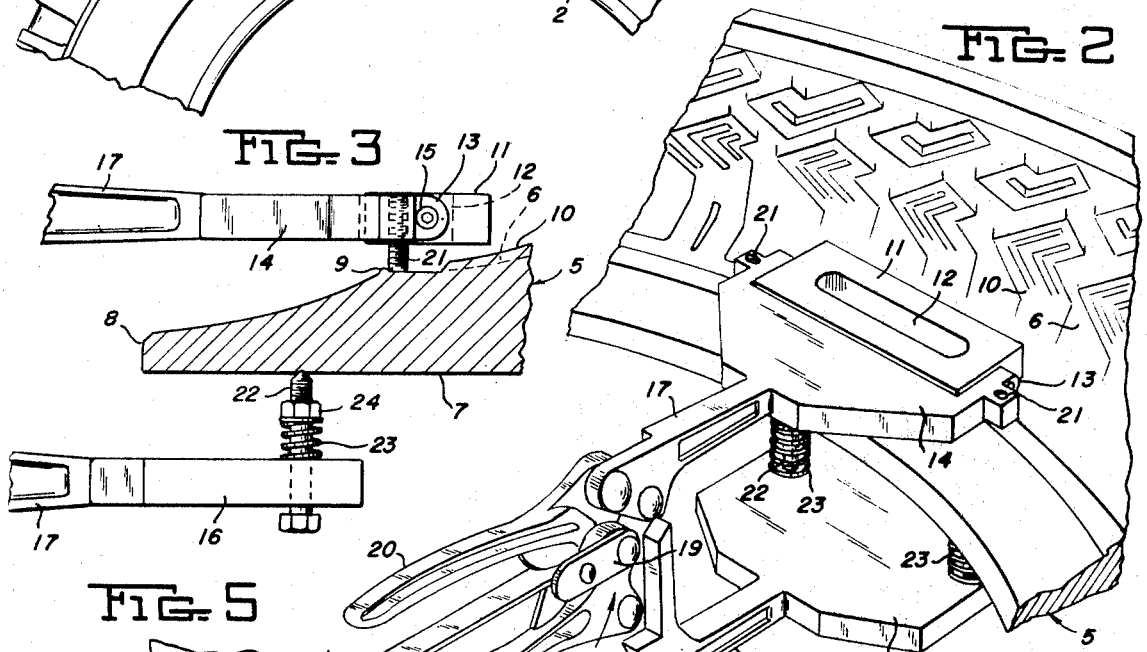
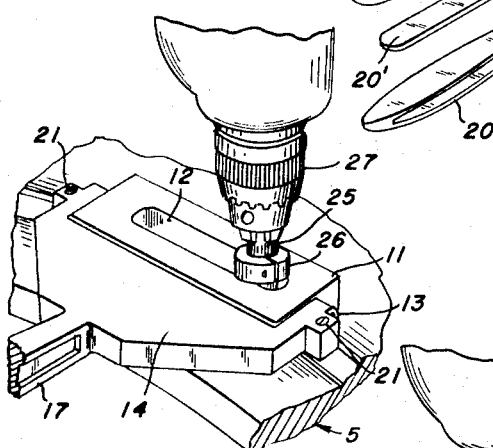
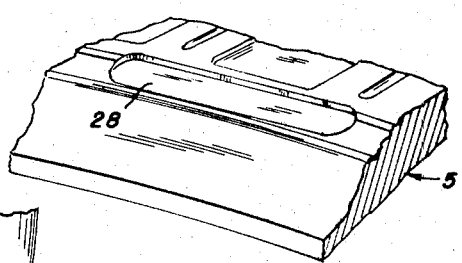
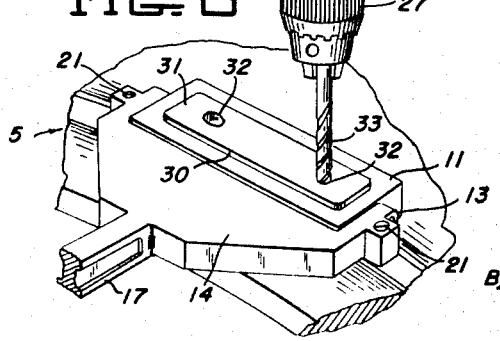
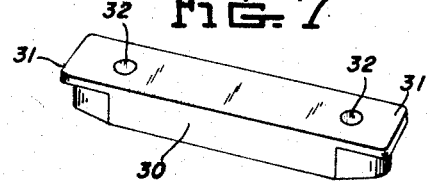
INVENTORS
EARL A. WINKELMAN and
PAUL A. FITZSIMMONS
their Attorneys

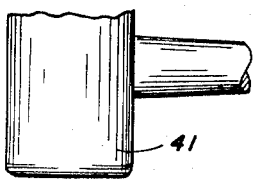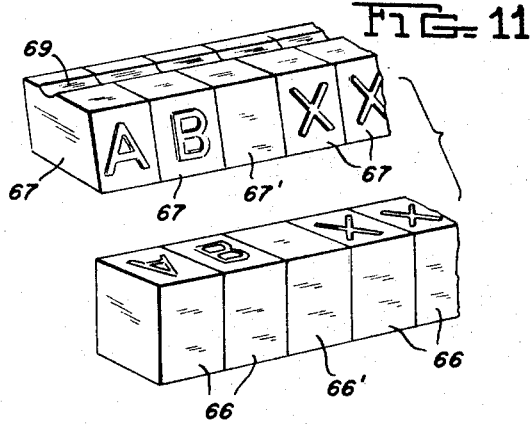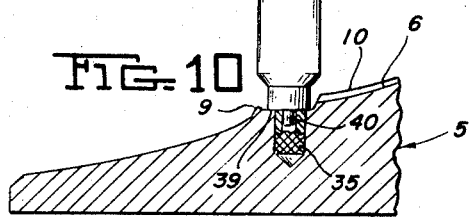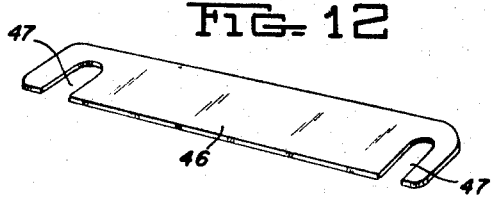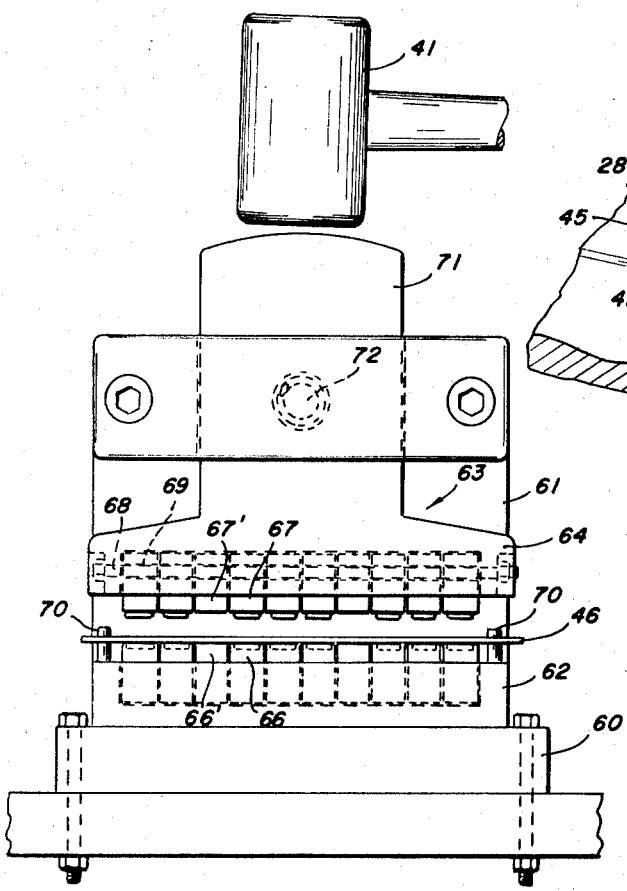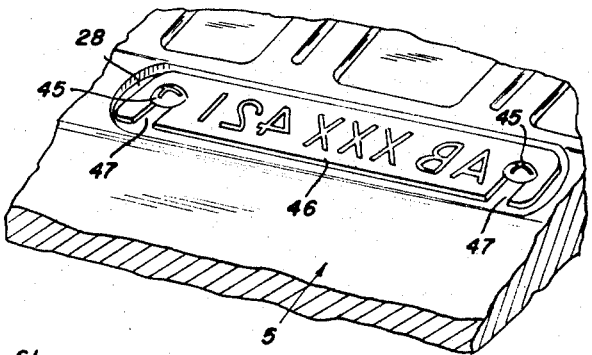

RETREAD TIRE MARKING METHOD AND APPARATUS

This invention is for a method of and apparatus for molding certain characters or indicia into a pneumatic vehicle tire when it is being retreaded.

The Department of Transportation (D.O.T.) has heretofore enforced a regulation requiring that the manufacturer of pneumatic vehicle tires mold into the side wall of the tire certain indicia that will identify the matter of the tire by a license number assigned to it by D.O.T., also the tire size by code letters adopted by the department, the style or type of tire by other code letters or numbers and finally an indication of the week in which the tire was made.

The manufacturers of tires whose molds have always included certain lettering, numbering, or other date to be molded into a tire had no difficulty in adapting this production molds to accept replaceable tags or slugs which would comply with this regulation, particularly since once the mold was prepared the date markings would require replacement each week. However, D.O.T. has now required that tire retreading shops also follow these regulations and retreading shop operators have been confronted with a difficult problem of adapting their molds to meet this requirement. The impressing of the letters DOT followed by the assigned license or shop number can be easily accomplished in the molds but the remainder of the marking has posed a considerable problem. First, a single retreading mold is commonly used for retreading perhaps two or three different tire sizes so this indicia must be changeable. Next, the retreader may be using the mold one day to retread one brand of tire having one type of fabric or cord or "belt" and another brand the next day having a different construction. Finally the date marking changes each week so that it is necessary that a recapping mold be economically capable of being changed in any one of these three respects.

There are many thousand retreading shops affected by this regulation, each of whom has a heavy investment in retreading molds that normally provide for forming no lettering, trademark, size or date since any markings formed in the tire by the original maker are generally left intact and have heretofore been considered adequate.

With the present invention, we can provide the operator of a retreading shop with a compact kit by which he can place certain data which need not be changed in the mold to be reproduced in the retreaded tire and also adapt the mold to receive tag holding means for replaceable easily embossed insert tags that will carry all the other data required by DOT, the kit including means for embossing the tags with the required information. It will be understood that these tags which the operator of the shop himself prepares are secured in the mold and replaced as required. As a part of this kit, we provide certain unique tools to which this application and their use is directed.

Briefly stated, there is to be removably applied to one of the two parts of a retreading mold and which has an elongated slot which is positioned over that part of the margin area of the mold where the side wall of the retread rubber joins the original side wall of the tire. With this clamp there is first used a power driven hand tool, such as an electric hand drill, with a milling bit. With the bit being rotated the tool is guided back and forth along the slot to cut a shallow flat recess in the metal mold. The molds are generally aluminum and the milling operation is rather quickly accomplished and thereafter it need not be repeated. When the flat has been so cut, a jig is dropped into said elongated slot, this jig having two spaced holes therethrough, one at each end of the flat. The hand tool then has a drill bit substituted for the milling cutter and the jig locates exactly the places where two holes will be located in the flat. These holes could be tapped to receive machine screws for holding the tags in place, but we prefer to make oversize holes and drive knurled internally threaded inserts into the holes so drilled so that the operator is not required to himself tap the screw holes.

These operations of milling the flat and drilling the holes having been accomplished, the clamp is removed and the knurled internally threaded bushings above referred to are driven into the holes. The clamping screws are screwed partway into the bushings and the mold is then ready to receive the replaceable tag.

The tag is a rolled steel strip of perhaps 0.015 thickness. Its width is slightly less than the width of the guide slot in the clamp and therefore narrow enough to be received in the recessed flat surface that has been milled and slightly less in length with notch terminals at each end that can be slipped under the heads of the screws. The required changeable data is embossed in this tag with a hammer driven embossing die having interchangeable type which is furnished to the retread shop in the kit along with a supply of blank tags. The operator embosses the tags as needed and when a tag is placed on the flat in the manner above described, the screws are tightened down to clamp the tag in place, whereup it forms a part of the mold surface and the edge or margin of the rubber retread as it is molded and vulcanized onto the tire carcass flows into the reversely embossed indicia on the tag, producing corresponding sunken characters on the margin of the retread.

The invention may be more fully explained in conjunction with the accompanying drawings in which:

FIG. 1 is a fragmentary side elevation of a portion of a retreaded tire illustrating how the markings appear on the recapped tire.

FIG. 2 is a perspective view showing a fragment of a retreading mold member with a processing tool clamped thereto.

FIG. 3 is a transverse fragmentary view showing a portion of the mold in section and showing portions of the clamping jaws of the tool applied to the mold in side elevation.

FIG. 4 is a perspective view of a special milling tool for use with the clamp of FIGS. 2 and 3.

FIG. 5 is a perspective view illustrating how the milling tool of FIG. 4 is used with the clamp arrangement of FIGS. 2 and 3 to cut a flat surface in the surface of the mold.

FIG. 6 is a fragmentary perspective view illustrating the appearance of the flat that is formed by the operation shown in FIG. 5.

FIG. 7 is a perspective view of a drilling jig used with the clamp of FIGS. 2 and 3 after the flat has been milled.

FIG. 8 is a perspective view illustrating the manner of using the jig.

FIG. 9 is a perspective view of an internally threaded—externally knurled sleeve or bushing designed to be used in the holes which are drilled by the operation shown in FIG. 8.

FIG. 10 is a partial transverse section through the mold showing the operation of setting one of the bushings of FIG. 9 in a hole.

FIG. 11 is a perspective view showing typical matching positive and negative embossing dies for embossing, or more accurately debossing, the metal tag, the positive upper dies being turned sideways to show their surfaces.

FIG. 12 is a perspective view of a typical tag.

FIG. 13 is a front elevation of the tag debossing device and illustrating the manner of operating it.

FIG. 14 is a fragmentary perspective view showing the tag holding portion of the mold with the debossed tag in place.

Referring first to FIG. 1, 2 designates the carcass of a used tire which has a retread 3 vulcanized thereto in the usual manner. The tread extends around the periphery and the sided or margins of the tread have a "feather" edge where it joins the original tire carcass. To meet the requirements of DOT there are markings applied to the margins outwardly facing margin area of the retread rubber where it is visible when the tire is on the wheel rim. For convenience the required markings or indicia are here separated into two groups, designated A and B.

The indicia in group A will be the same for all molds of the same retreading shop. This indicia will comprise the letters DOT followed by a number, generally a three digit number, which is a number assigned to a retreading shop by DOT, much like a license number and it serves as an identification of one particular shop. Since the markings of group A are not required to be changed, impressions may be made directly in the retreading mold in the retread rubber in the side area where the margin where the applied rubber merges onto the side wall of the tire carcass. It is proposed to furnish a tire retreading shop as a part of his mold marking kit individual marking punches to be struck with a hammer for counter-sinking this indicia into his molds.

The second group B of characters on the side of the retreaded tire comprises a first combination of two characters which are a DOT code designation of the tire size. Since one pair of retreading molds can be used for retreading more than one size of original tire the first numbers in group B in the mold are desirably changeable. The next three are a code designation for the original manufactures and the grade a style. The next three characters designate the year the the week of the year. The number 421 for example, would designate the forty second week of 1971, the first two digits indicating the week and the last the year. The mold insert for forming the last two sets of characters must therefore also be changeable.

It is with the changeable indicia that the present invention is particularly concerned. It is accomplished by the use of an embossed metal tag removably secured in the mold.

The conventional retreading mold comprises two complementary annuli which when put together will receive the periphery of the tire carcass with the rubber which is to be vulcanized and molded adhesively applied to it. The mold sections are commonly formed of aluminum. In the drawing 5 designates a portion of one of these mold rings or sections. It has a concave mold surface 6 and a flat outer surface 7. The part of the concave mold surface between the inner periphery 8 and an anular bead 9 is smooth to fit against and conform to the outside wall of the tire which is to be retreaded. The bead 9 marks the inner boundry to which the retread rubber must be molded. Outwardly from this bead there is a narrow band from which the raised elements 10 on the mold surface which form the grooves in the molded tread start to take shape.

With the present invention, there is an elongated guide member 11 having a long slot 12 therein. This guide is pivotally mounted at its ends in lugs 13 on the outer edge of a wide clamping plate 14. In other words the outer edge of the clamping plate 14. In other words the outer edge of the clamping plate 14 is bifurcated with the guide member 11 received between the two extensions or lugs 13, the guide being secured in place by pivot pins 15. This pivotally mounting of the guide allows the guide plate to change its angle slightly relative to the plane of the clamping plate.

The clamping plate 14 constitutes the upper one of two jaws while the lower jaw is designated 16. Each of these plates has an extension 17 that is coupled at 18 through a well known type of toggle linkage 19. There are handles 20 for these two jaws by means of which they can be closed and when closed under pressure on an object to be gripped, they will remain clamped to that object until released by a trip lever 20' between the two handles. This is sometimes referred to as a "vise-grip" type of linkage. Each of the jaws or clamping plates 14 and 16 have gripping screws or pins 21 and 22, respectively thereon, the screws 22 on the lower jaw being slidably passed through the jaw with a strong compression spring 23 confined between the jaw and a nut 24 to resiliently urge the pin against the flat outer surface 7 of the mold (See FIG. 3).

The jaws and their extensions 17 are long enough so that the jaws can be positioned on the retreading mold section to position the slot 12 off the guide member 11 outwardly of, but preferably close to, the bead 9 of the mold. Sometimes however, this slot may be positioned outwardly to a point where the slot is even over the beginning of the raised tread forming surfaces of the mold.

With the guide plate clamped to the mold so that the slot 12 is outside of bead 9 on the mold, the operator takes the small end milling cutter or tool shown in FIG. 4 and mounts it in the chuck of a portable hand-held electric or air drill. This milling bit comprises a shank 25 with an axially adjustable collar 26 fixed therein and with cutting teeth at the end of the working end of the shank. The diameter of the shank is such that is has a free turning fit in the slot 12 of the guide 11. Having fitted the cutter in the chuck of its hand-tool, the operator inserts the cutter in the slot 12 of the guide and moves the tool back and forth along the guide as indicated in FIG. 5 where 27 indicates the chuck and a portion of the tool. The operator continues this until the collar 26 sliding on the guide 11 permits any further depth of cutting.

In performing this operation a flat elongated shallow cavity 28 (See FIG. 6) is milled or cut into the mold surface perhaps just about tangent to the bead 9 or outwardly therefrom a short distance. However, having milled a flat surface in this manner in the mold surface, the operator does not remove the clamp, but with the clamp still undisturbed he drops a drilling jig 30 into the slot 12. This jig is an elongated bar with rounded ends that fits snugly into the guide slot 12 with end portions 31 that prevent the jig from droping through the slot 21. There are guide holes 32 through the jig, one near each end.

The operator then puts a drill bit 33 in the chuck of the electric or air driven tool 27, this bit having a working fit in the holes 32 of the jig. Placing the bit first in one hole of the jig and then the other the operator drills two spaced relatively shallow holes in the mold one hole being near each end of the flat 28. This being done, the operator then releases the clamp and removes it from the mold. The flat surface that has been milled then has two accurately positioned holes therein, one near each end.

Supplied with the kit above referred to is a supply internally threaded externally knurled steel bushings or sleeves 35 (See FIG. 9). Each bushing has a diameter such that it will have a drive fit in one of the holes. The kit contains a tool for driving or "setting" these bushings in the holes. It comprises a shank 38 having a flat bottom end 39 with a pin 40 at its center. This pin will fit into the hole in the bushing but not mutilate the threads. Centering a bushing over the hole in the mold, the operator holds the tool by its shank 38, enters the pin in the bushing and strikes the drive tool with a hammer 41 (FIG. 10) driving the bushing into the hole in the mold with its top flush with the flat surfaces. When properly set the bushing will stay in place and held against turning for an indefinite period of time. Using internally thread sleeves on bushings in this way, accurately positioned internally thread holes are formed in the mold without requiring the operator to tap the holes himself. Each of the two bushings are for the purpose of receiving headed machine screws 45, one near each end of the flat (See FIG. 14).

The replaceable mold insert tags 46 are similar to that shown in FIG. 12. Each is a strip of sheet metal of a length slightly less than the length of the slot 12 in the guide 11 and of a width slightly less than the width of said slot so that the tag will lie flat against the flat surface which has been milled into the mold to receive it. Near each end it is notched at 47 from one edge crosswise to a point just past the longitudinal center-line of the tag. In this way the tag can be inserted by partly unscrewing screws 45 and slipping out any tag previously used and slipping the replacement in, after which the screws or bolts 45 are tightened down. With the tag notched in this way it is unnecessary to remove the screws with each tag change.

To enable the tire retread shop to prepare tags according to its needs, the kit has a tag debossing stamp with matching positive and negative dies and a supply of blank tags. The stamping tool comprises a base 60 with an upright 61 thereon. There is a lower type holder 62 on the base with a row of negative or recessed type blocks removably retained therein and with spacer blocks between the type blocks. There is a vertically movable upper platen assembly 63 with an elongated upper type holder 64 confronting the lower one. It has positive or debossing type therein matching the lower ones. These type members or blocks are shown in FIG. 11, each character being separate from the others. The type elements of lower series are designated 66 and 66' is a blank space. The upper type blocks are designated 67 and 67' are spacers. In FIG. 11 the upper type are turned sideways to show the characters on the faces thereof but in use the characters of the two sets of type face each other. The upper type are held in their holder by a rod 68 that is slidable lengthwise of the holder and it engages registering notches in 69 in the side faces of the type blocks.

The removable lower type holding block 62 has a pin 70 at each end. The blank tag as seen in FIG. 12 is placed on the type in the lower holder with the end slots of the tag slipped past the pins 70 to hold the tag in position on the type. The upper tag holder is carried on a stem 71 that is slidably guided in the upright 61. With the tag in place, the top of the stem is struck forceably with a hammer embossing the tag. A spring detent 72 of common construction releasably holds the upper type holder and platen in a raised position.

It will be seen that with a relatively inexpensive kit the operator of a tire retreading shop can easily comply with the DOT regulations, using his present molds and making his own changeable mold inserts at little expense.

We claim:

1. The method of preparing a tire recapping mold to mold characters in the retread rubber which characters will differ from time-to-time, said method comprising:
   a. clamping an elongated tool guide onto the mold surface in a location where a side margin of retread rubber will be applied to a tire, said guide having a slot therein running lengthwise thereof,
   b. entering an end-cutting milling cutter which has a cylindrical shank in the slot in said guide while the cutter is mounted in and rotated by a motor driven hand tool and moving the cutter back and forth along the guide while its end is cutting the surface of the mold and forming thereby an elongated flat shallow countersunk strip in said margin molding surface of the mold,
   c. locating a machine screw-receiving threaded hole in said flat strip near each end thereof, and
   d. forming a sheet metal tag with debossed indicia thereon and securing it on said flat strip by machine screws entered in said threaded holes and which pass through openings in the tag.

2. The method defined in claim 1 in which said tags are formed with a notch at each end positioned to be slipped under the heads of machine screws previously screwed into said holes and not completely screwed down and then tightening the screws to confine the notched ends of the tag under the screw heads.

3. Apparatus for preparing a tire recapping mold to receive an indicia forming tag comprising:
   a. an elongated tool guide having a slot extending lengthwise therealong from a location near one end of the guide to a location near the other end,
   b. means for clamping said guide to a tire mold in a position where the margin of a tread recap will be vulcanized to the original tire carcass,
   c. an end-milling cutter having a cylindrical shank of a diameter to have a working fit in said slot, and
   d. a power driven portable hand tool having a chuck for receiving and rotating the milling cutter while the cutter is moved back and forth along said guide with its cutting end cutting a flat strip in the surface of the mold.

4. Apparatus for preparing a tire recapping mold as defined in claim 3 wherein there is a jig removably fitted in said slot having a drill bit guiding hold therethrough near each end thereof whereby holes may be exactly located in the flat strip and drilled after it has been formed in the mold and before said guide is released from the mold to which it is clamped.

5. Apparatus for preparing a tire mold as defined in claim 3 wherein said means for clamping the guide to the tire mold comprises a clamp having two opposed jaws with means for moving them toward and away from each other, said guide being carried on one of said jaws.

6. Apparatus for preparing a tire mold as defined in claim 3 wherein said means for clamping the guide to the tire mold comprises a clamp having two opposed jaws with means for moving them toward and away from each other, said guide being pivotally carried on one of said jaws for rotation about its longitudinal axis.

7. Apparatus for preparing a tire mold as defined in claim 3 wherein said means for clamping the guide to the mold comprises a tool having opposed jaws arranged to clamp a portion of a tire mold between them and remain clamped until the jaws are manually released, one of said jaws having spaced lugs at the free edge thereof, the guide being positioned between and pivotally secured to said lugs for rotatable adjustment in the jaw about the longitudinal axis of the guide.

8. The method defined in claim 1 wherein said sheet metal tag is slightly shorter in length than the flat strip area and slightly narrower in width.

* * * * *